W. R. LANDFEAR.
Car-Starter.

No. 196,463. Patented Oct. 23, 1877.

Witnesses:
Benj. W. Hoffman
Fred Haynes

Inventor
W. R. Landfear
by his Attorneys
Brown & Allen

UNITED STATES PATENT OFFICE.

WILLIAM R. LANDFEAR, OF HARTFORD, CONNECTICUT.

IMPROVEMENT IN CAR-STARTERS.

Specification forming part of Letters Patent No. 196,463, dated October 23, 1877; application filed April 26, 1875.

*To all whom it may concern:*

Be it known that I, WILLIAM R. LANDFEAR, of Hartford, in the county of Hartford and State of Connecticut, have invented an Improvement in Car-Starters; and I do hereby declare that the following is a full, clear, and exact description of the same, reference being had to the accompanying drawing, which forms part of this specification.

My invention relates to a system of mechanism attached to a horse-car for the purpose of temporarily applying the power of the team directly to the wheels to start them in motion, and then transferring the power to the car, as usual.

The invention consists in a novel arrangement of a pawl-and-ratchet mechanism and a system of levers and connecting-rods, and the combination thereof with the axle and draw-bar of the car, whereby great power is obtained to enable the team to start the wheels before resuming the usual draft condition.

Figure 1:
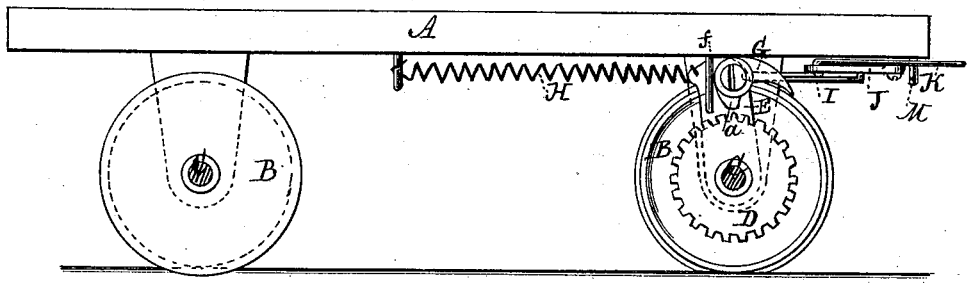
Figure 2:
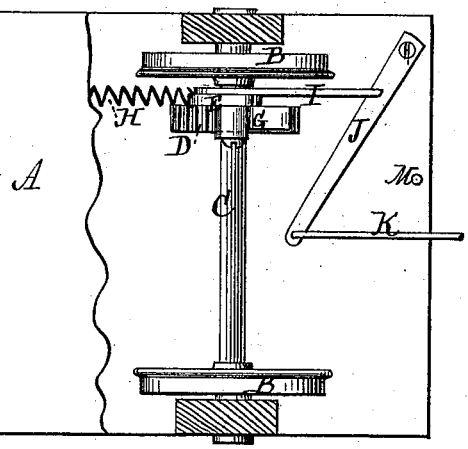
Figure 3:
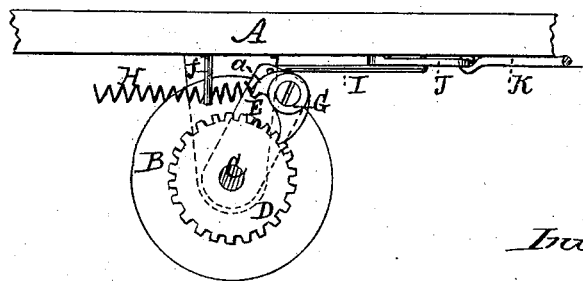
Figure 4:
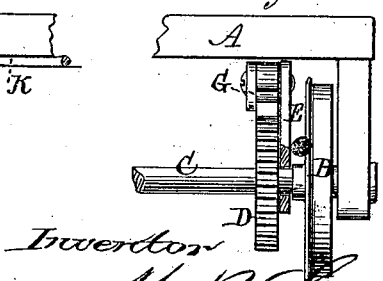

In the accompanying drawing, Figure 1 is a longitudinal vertical section of a car with my invention applied thereto. Fig. 2 is a top view, with the floor of the car partly broken away. Fig. 3 is a vertical sectional view, showing the parts in a different position from that shown in Fig. 1. Fig. 4 is a front view, partly in section.

A represents the floor of the car, B the wheels, and C the axle. To the axle C, preferably near one end, is rigidly attached a ratchet-wheel, D, the teeth of which are arranged for engagement with a pawl in either direction. On the axle C, between the wheel B and the ratchet D, is pivoted a vertical lever, E, the axle passing through the lower end of the lever and forming the fulcrum thereof. Near the upper end of the vertical lever E is pivoted a pawl, G, having its toe formed for engagement with the ratchet D, and its heel $a$ rounded for engagement with an abutment consisting of a pin or stud, $f$, extending downward from the bottom A.

To the upper end of the lever E is attached one end of a spring, H, the other end of which is attached to the under side of the floor A. The spring H has a tendency to keep the lever E pulled backward toward the abutment $f$, in the position shown in Fig. 1.

J is a lever, pivoted at one end to the under side of the floor A, so as to oscillate in a horizontal plane, the fulcrum or pivoted end being as near as practicable to the edge of the car, and the other end extending laterally to the middle of the front portion. To the other end of this lever is attached one end of a rod, K, the outer end of which is provided with means for attaching the draw-bar or tongue, to which the team is harnessed.

The horizontal lever J is connected with the upright lever E by a connecting-rod, I, one end of which is attached to the upper end of the lever E, and the other end is attached to the horizontal lever J, between the fulcrum and the outer end, in such a position as to enable said horizontal lever to exert the greatest possible amount of power when being pulled in a forward direction.

By this arrangement and combination of the various parts a much greater leverage is obtained than would be possible if the team were attached so as to draw directly on the lever E, without the interposition of the horizontal lever.

The team being attached to the rod K, and the parts being in the positions shown in Figs. 1 and 2, with the car at a stand-still, when the team first starts the pawl G drops of its own weight, and engages with the ratchet D, and thus the power is temporarily applied directly to the wheels, and motion applied thereto to start them to rolling.

The application of power to the wheels continues until the horizontal lever J is arrested by a stop, M, on the under side of the front platform, whereupon the power is transferred to the car, and the usual draft condition is resumed. When the horizontal lever J is arrested by the stop M, the upright lever E is inclined forward, and the pawl D, by its own weight, assumes a vertical position, so as to remain clear of the ratchet as long as the direct draft on the car continues. By this means the necessity for a special device for engaging and releasing the pawl is obviated.

When the car is stopped, the spring H pulls the vertical lever backward until the rounded heel of the pawl G strikes the abutment $f$, which disengages the pawl from the ratchet, and leaves the wheels free to revolve in the opposite direction.

This invention possesses advantages over many others of a similar character, by reason of the great power obtained in consequence of the peculiar arrangement of the parts, and especially the interposition of the horizontal lever. The mechanism is simple, and is readily applied to any car, without alteration of or interference with any of the parts of the car.

When the car is to run in one direction only, the invention is applied to only the front wheels; but when used on a car running both ways, the parts are duplicated and applied to both axles.

I am aware that the patent of May 13, 1873, No. 138,848, shows a spring-actuated pawl combined with a chain, lever, and draw-rod; also, that Patent No. 111,294, of January 24, 1871, shows a pawl operated by a rod connected with an actuating mechanism controlled by springs in conjunction with the draw-rod. Both the devices of these patents resemble my invention in having a pawl, ratchet, pawl-carrying lever, and a rod or equivalent connecting said pawl-carrying lever with the draw-bar through an intermediate lever; but neither of them shows the pawl actuated solely by its own weight to engage with the ratchet, and operating to release the ratchet by means of its rounded heel, an abutment, and spring; and this last-named combination is the gist of my invention.

What I claim as new, and desire to secure by Letters Patent, is—

1. The car-starter herein described, consisting of the ratchet D, fast on the axle, the lever E, loose on the axle, and provided with the retracting-spring H, the rod I, secured to said lever E and to the lever J, the draw-rod K, stop M, the abutment $f$, and the pawl G, the said pawl having the rounded heel $a$, and the whole constructed, arranged, and operating substantially as shown and specified.

2. The pawl G, hung in the lever E, and arranged to engage solely of its own weight with the ratchet D, and to be disengaged therefrom by the provision of the rounded heel $a$, which, as the lever E is drawn back by the spring H, comes in contact with the abutment $f$, and frees the toe from the teeth of the ratchet, substantially as described.

WILLIAM R. LANDFEAR.

Witnesses:
BENJAMIN W. HOFFMAN,
FRED. HAYNES.